United States Patent [19]

Gérard

[11] Patent Number: 4,564,089
[45] Date of Patent: Jan. 14, 1986

[54] FRICTION-ELEMENT ASSEMBLY EQUIPPED WITH AN ANTI-NOISE SPRING FOR A DISC BRAKE

[75] Inventor: Jean-Louis Gérard, Paris, France
[73] Assignee: Societe Anonyme D.B.A., Paris, France
[21] Appl. No.: 557,559
[22] Filed: Dec. 2, 1983
[30] Foreign Application Priority Data
Dec. 23, 1982 [FR] France ................. 82 21684
[51] Int. Cl.⁴ .................. F16D 55/224; F16D 65/12; F16F 15/06
[52] U.S. Cl. ................. 188/73.38; 188/250 B
[58] Field of Search ........... 188/73.38, 73.37, 205 A, 188/206 A, 206 R, 73.1–73.2, 250 B, 250 G, 250 E, 73.45, 73.47, 73.32, 73.35, 73.36, 73.39

[56] References Cited

U.S. PATENT DOCUMENTS 3,972,393 8/1976 Courbet et al. ............... 188/73.3
4,027,751 6/1977 Gérard ........................ 188/73.5
4,474,769 11/1979 Gérard ........................ 188/73.6

FOREIGN PATENT DOCUMENTS 0080949 6/1983 European Pat. Off. ......... 188/73.38
2522625 12/1976 Fed. Rep. of Germany .
2311965 12/1976 France .
2325298 4/1977 France .
2378209 8/1978 France .

Primary Examiner—Douglas C. Butler
Attorney, Agent, or Firm—Larry J. Palguta; Ken C. Decker

[57] ABSTRACT

The lining support plate (11) incoporates a widened lug part (16) which prolongs a neck part (15) round which is arranged the end loop (31) of the wire spring (30), of which the end of the strand portion (32) opposite the loop (32) has at least one transverse bent part (37) intended to be received in a central through-orifice (22) in the plate (11).

2 Claims, 9 Drawing Figures

FRICTION-ELEMENT ASSEMBLY EQUIPPED WITH AN ANTI-NOISE SPRING FOR A DISC BRAKE

The present invention relates to friction elements for disc brakes, and more particularly to a friction-element assembly equipped with an anti-noise spring.

The present invention relates more specifically to a friction-element assembly equipped with an anti-noise spring, the friction assembly incorporating a lining-support plate intended to cooperate in anchoring and sliding engagement with guide surfaces of a disc-brake torque support member by means of notches formed on the lateral edges of the plate, the latter incorporating at the level of at least one of these notches an aperture formed in the adjacent transverse edge for the fitting of the anti-noise spring, this aperture and the adjacent notch forming a neck part prolonged outwards in a widened lug part, the spring consisting of an elastic wire and having an end part in the form of a closed loop intended to be engaged round the neck part of the plate so as normally to bear by means of its central part against a bearing zone of the aperture, the loop being prolonged by a strand portion provided, at its end opposite the loop, with means for fitting onto the central zone of the lining support plate.

Such an assembly is described in French Patent Application A-81/22347 of 30th Nov. 1981 in the Assignees name, which corresponds to U.S. application Ser. No. 692,327 that is a continuation of U.S. application Ser. No. 446,071, now abandoned, the content of which is assumed to be incorporated here for reference. This document describes, especially with regard to the embodiments of FIGS. 1 to 7, a friction element on which the spring of the type defined above is held in place by means of a gripper formed at the end of the strand portion and engaged frictionally on the upper transverse edge of the lining support plate. However, this arrangement entails risks that the gripper will escape during operations involving the transport or fitting of the equipped assembly, and this can cause damage to the spring. Furthermore, locking the spring by gripping does not guarantee that the loop of the spring occupies, with regard to the neck part which it surrounds, the position which it is required for the equipped element to be fitted in a disc brake.

The object of the present invention is precisely to propose a combined arrangement of a friction element and an anti-noise brake of simple configuration, low production costs and easy handling, which allows the spring to be secured against loss, whilst ensuring that it is positioned correctly on the friction element for being fitted in a disc brake.

For this purpose, according to a feature of the invention, the lining support plate has, at the level of its central zone, a through-orifice in which the transversely bent end of the strand of the spring is received.

According to another feature of the invention, the length of the strand portion is greater than the distance between the orifice and the adjacent end of the widened lug part which limits the aperture for fitting the spring on the support plate, and less than the distance between the orifice and the bottom of the fitting aperture.

In addition to the advantages mentioned above, this arrangement allows the spring to be fixed to the friction element without undergoing any stress and therefore any fatigue while waiting to be fitted on the brake.

Other features and advantages of the present invention will emerge from the following description of an embodiment given as an illustration but in no way limiting, the description being made with reference to the attached drawings in which.

Figure 1:
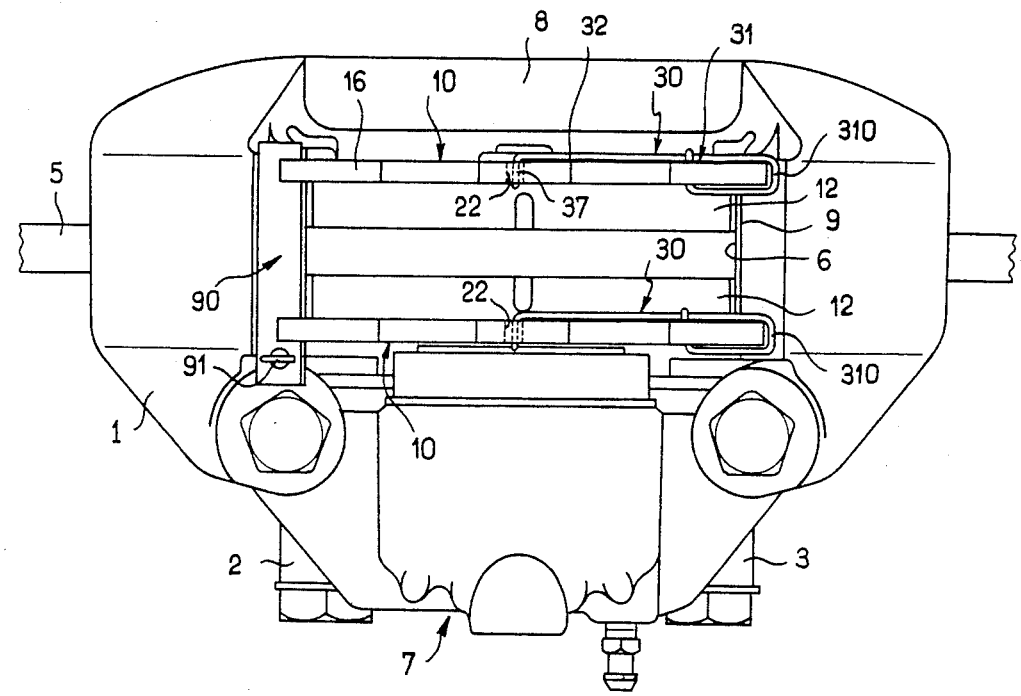
FIG. 1 is a plan view of a disc brake provided with friction-element assemblies equipped according to the invention.
Figure 2:
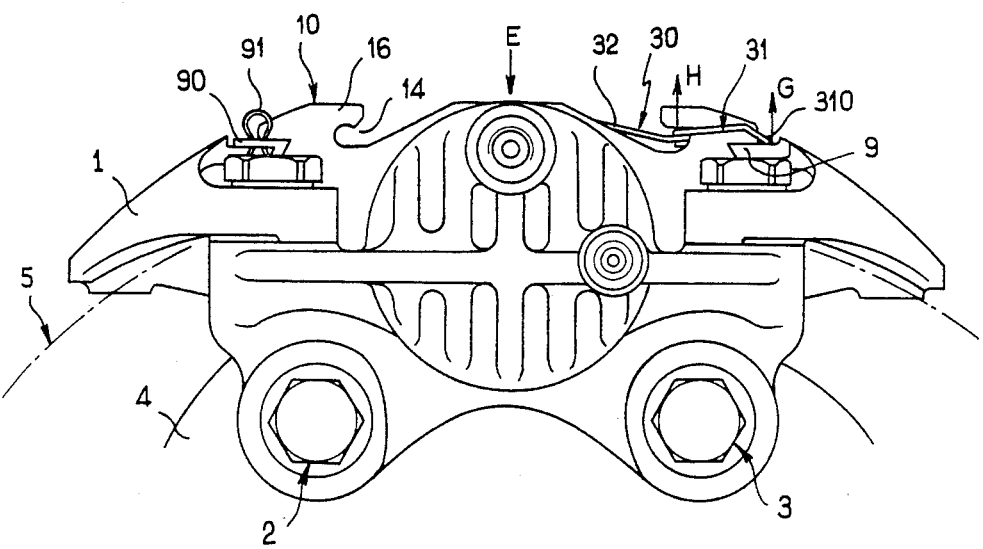
FIG. 2 is a front view, from the inner side, of the brake of FIG. 1.

FIGS. 1 and 2 illustrate by way of example a disc brake to which the combined friction-element assemblies according to the invention are suitable. This brake is of the type incorporating a caliper 1 which is mounted to slide by means of two axial columns 2 and 3 on a fixed support, indicated at 4, intended to be fastened to a stationary part of a vehicle (not shown), the caliper 1 straddling a rotary disc 5 intended to be associated with a wheel of the vehicle. The caliper 1 incorporates, in its part straddling the disc, an orifice 6 delimited by lateral dihedral edges which extend axially and which act as a torque support member for a pair of friction elements 10 located on either side of the disc 5. The inner friction element is actuated directly by the piston of a brake motor 7 associated with the caliper 1, the outer friction element being actuated as a result of reaction against the disc via the outer reaction part 8 of the caliper. As can be seen in FIG. 2, the friction elements 10 are received so as to be anchored and to slide on the opposite edges of the orifice 6 which are profiled in the form of a wedge 9, one of these edges (the left-hand edge in FIGS. 1 and 2) being equipped with an axial sliding key 90 which is located between this edge and the corresponding lateral edge of the friction elements 10 and which is locked by means of a pin 91, this key 90 allowing the friction elements 10 to be extracted radially when this key is extracted axially from the brake.

Figure 3:
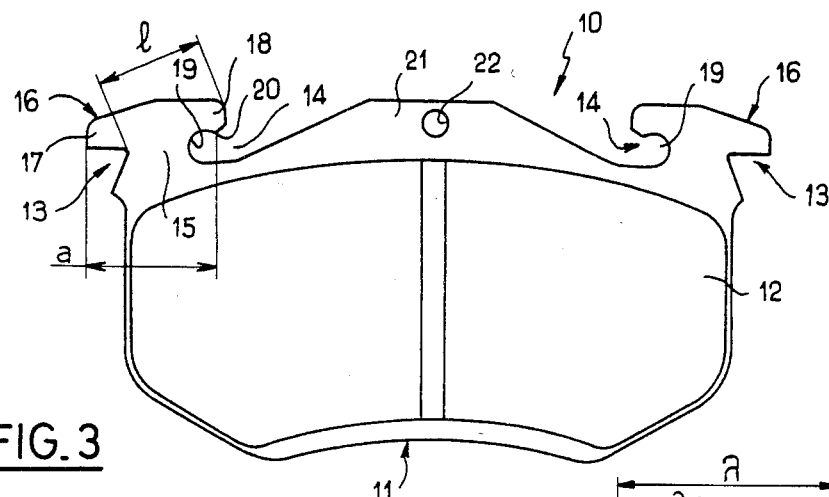
FIG. 3 is a front view of a friction element according to the invention.

As can be seen clearly in FIG. 3, the friction elements 10 consist of a lining support plate 11 on which a friction lining 12 is fastened, for example by bonding; the lateral edges of the friction element 10 are formed, in the vicinity of their upper radial end, with V-shaped notches 13 having a profile corresponding to that of the edges 9 and of the key 90 mentioned above. In the vicinity of at least one of these notches 13, the plate 11 incorporates, in its transverse upper edge, a spring fitting aperture 14, the aperture 14 and the notch 13 defining therebetween a neck part of reduced width 15 which forms a base for a widened lug part 16 comprising two opposite lateral arms 17 and 18. The arm 17 defines the upper edge of the notch 13, while the lateral arm 18 is shaped so as to provide, at the bottom of the aperture 14, a bearing zone 19 of substantially cylindrical profile with a projecting rim or edge 20 partially closing this bearing zone 19. The raised central zone 21 of the plate 11 between the two fitting apertures 14 is provided, in the vicinity of the upper edge, with a through-orifice 22 located, for example, in the plane of symmetry of the friction element 10.

Figure 4:
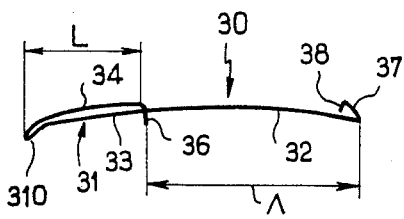
FIG. 4 is a diagrammatic side view of an anti-noise spring according to the invention.
Figure 7:
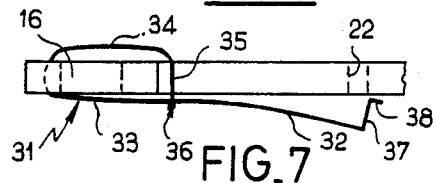
Figure 8:
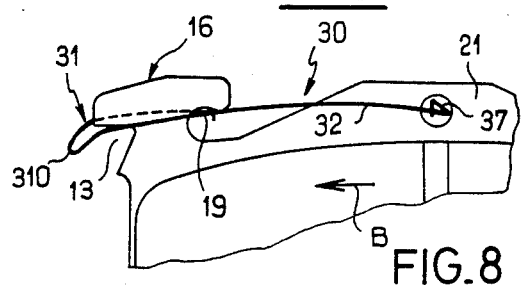
Figure 9:
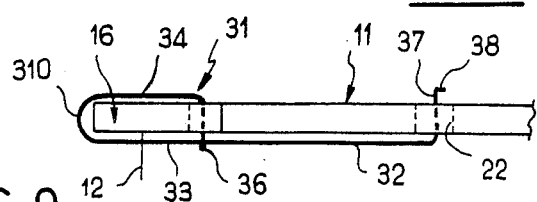

As may be seen in FIG. 4, the anti-noise spring 30 according to the invention, which is made from an elastic metal wire, incorporates an end part 31 in the form of a loop which has, in a plan view, a substantially rectangular profile (as can be seen in FIGS. 7 and 9) and which is prolongated by a spring strand portion 32. As can be seen in FIG. 9, in the configuration of rest, and in a plan view, the strand portion 32 is prolongated linearly so as to constitute a first side 33 of the loop 31, the other side 34 of the loop extending substantially parallel to the first side 33 so as to be prolonged by a transverse closing side 35, the end 36 of which is folded back to close the loop around the strand portion 32-33. The end of the loop 31 opposite the strand portion 32 is slightly folded back angularly downwards to constitute a nose 310 which is intended, in the fitting configuration, to bear on the upper face of the inner lateral edge 9 of the caliper, as can be seen in FIGS. 1 and 2.

Figure 6:
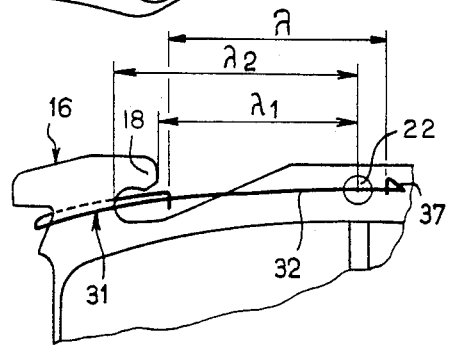
FIGS. 5 to 9 illustrate the steps for fitting the anti-noise spring of FIG. 4 on the friction element of FIG. 3.
Figure 5:
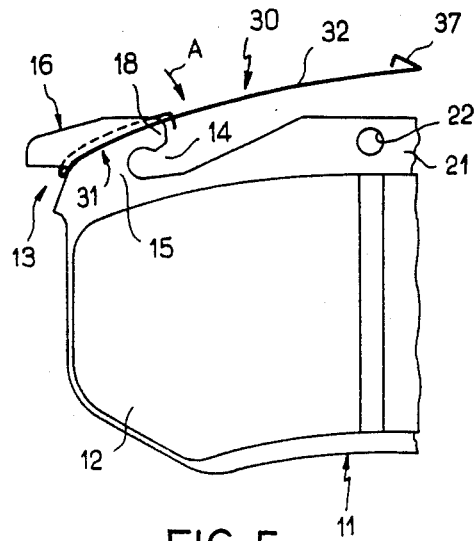

According to the invention, the axial inner length L of the loop 31 is greater than the distance l corresponding to the circle centered on the bottom of the notch 13 and tangential on the outside to the lateral lug 18, this length L on the other hand being less than the distance a between the inner edge 20 of the lug 18 and the outer end of the opposite lug 17. The end of the strand portion 32 opposite the loop 31 forms a first transversely bent portion 37 extending perpendicularly to the strand portion 32 in the direction towards the side 34 of the loop 31, this first bent portion 37 itself ending in a bent second portion 38 extending perpendicularly to the portion 37 and to the general plane of the loop 31. The inner transverse width of the loop 31 and the length of the first portion 37 are greater than the thickness of the lining support plate 11 of the friction element 10. As can be seen in FIG. 6, the length Λ of the section 32 between the loop part 31 and its bent end 37 is greater than the distance λ1 between the axis of the orifice 22 and the adjacent end of the lug 18 partially delimiting the aperture 14 and is less than the distance λ2 between the axis of the orifice 22 and the bottom of the bearing zone 19 delimiting the neck part 15 laterally.

The procedure for fitting and putting in place the spring 30 on the friction element 10 is detailed in succession in FIGS. 5 to 9. The spring 30 is first presented above the widened lug part 16 so as to engage the nose 310 in the notch 13. The nose 310 is brought into the bottom of the notch 13, and then the spring as a whole is tilted in the direction of the arrow A in FIG. 5 in such a way that the loop 31 passes over the lug 18 and reaches into the fitting aperture 14 so as finally to assume the configuration illustrated in FIG. 6. In this configuration, the bent end 37 of the section 32 is located beyond the orifice 22 in the direction opposite the lug part 16, and the strand portion 32 is momentarily bent laterally, as illustrated in FIG. 7, because the bent end 38 of the arm 32 bears on the adjacent face of the lining support plate 11. From this position, the spring 30 as a whole is displaced in the direction towards the lug part 16, as indicated by the arrow B in FIG. 8, so as to bring the transverse closing side 35 of the loop 31 into the bearing part 19 of the aperture 14 and, together with this, the bent end 37 of the strand portion 32 facing the orifice 22, the nose 310 itself being disengaged from the notch 13. Because it has come facing the orifice 22, the bent end of the section 32 thus penetrates into the latter so that the end 38 projects on the other face of the plate 11 in the final fitting position illustrated in FIG. 9, with the strand portion 32 and its prolongation 33 extending parallel to the plane of the adjacent face of the plate 11, the spring 30 being locked in the operating position on the plate 11.

Referring again to FIGS. 1 and 2, when the friction elements 10, equipped with the spring 30, are put in place in the brake, in this fitting configuration on the brake the loop part 31 bears, as indicated by the arrow H in FIG. 2, by means of its transverse closing side 35, against the upper bottom wall of the bearing zone 19, while the loop 31 is stressed elastically upwards by its end nose 310, the nose 310 bearing elastically, as indicated by the arrow G in FIG. 2, on the upper face of the lateral edge 9 of the caliper, the bent end 37 bearing in the opposite direction in the orifice 22, as indicated by the arrow E in FIG. 2; the spring 30 thus interacts with the friction element and with the torque support so as to keep the friction element laid against and engaged on the torque support element and thereby to prevent the noise which would result from relative displacement between these two components. As may be seen in FIGS. 4 and 5, the spring 30 advantageously has, in a side view, and at rest, a curved shape so as to guarantee effective stressing of the friction element in the fitting configuration in the brake. In this same configuration of rest, the transverse portions 35 and 37 of the spring have such dimensions that the bent end 38 of the strand portion 32 is substantially coplanar with the side 34 of the loop 31 opposite the portion 32.

Although the present invention has been described in relation to a particular embodiment, it is not limited thereby, but is on the contrary susceptible of modifications and alternative forms which will appear to a person skilled in the art.

I claim:
1. A friction-element assembly equipped with an anti-noise spring, the friction-element incorporating a lining-support plate intended to cooperate in anchoring and sliding engagement with dihedral guide surfaces of a torque support member of a disc brake by means of notches formed in the lateral edges of the support plate, the support plate incorporating, at a level of at least one of said notches, an aperture formed in an adjacent transverse edge for fitting of the anti-noise spring, said aperture and an adjacent one of said notches forming a neck prolongated outwardly by a widened lug part, the spring comprising an elastic wire and having an end part in the form of a closed loop engaged around the neck part to bear normally by means of a central part against a bearing zone of the aperture, the loop being prolongated by a strand portion provided at an end opposite the loop with means for fitting on a central zone of the lining support plate, characterized in that the lining support plate has, at a level of the central zone, a single through-orifice receiving therethrough a transversely bent end of said strand portion of said spring, the closed loop comprising an orthogonally bent end of the central part extending over and engaging the elastic wire and a radially inwardly bent nose portion at an end of said loop, the length of said strand portion being greater than a distance between said orifice and an adjacent end of said lug part limiting the aperture for the spring, and the length of said strand portion being less than a distance between the orifice and a bottom portion of said aperture delimiting said neck part laterally, the end of said strand portion opposite the loop forming the transversely bent end which is received in the orifice of the plate and extends to an orthogonally bent end portion located on a side of the support plate opposite a side along which said strand portion extends.

2. The assembly in accordance with claim 1, characterized in that, at rest, said orthogonally bent end portion is substantially coplanar with a side of said loop opposite said strand portion.

* * * * *